United States Patent
Gunawardena (10) Patent No.: US 8,387,144 B2
(45) Date of Patent: *Feb. 26, 2013

(54) NETWORK AMPLIFICATION ATTACK MITIGATION

(75) Inventor: Dinan S. Gunawardena, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/106,748

(22) Filed: May 12, 2011

(65) Prior Publication Data

US 2011/0214180 A1  Sep. 1, 2011

Related U.S. Application Data (63) Continuation of application No. 10/837,434, filed on Apr. 29, 2004, now Pat. No. 7,966,661.

(51) Int. Cl.
*G06F 11/00* (2006.01)

(52) U.S. Cl. .......................................... 726/23

(58) Field of Classification Search ..................... 726/23
See application file for complete search history.

(56) References Cited

U.S. PATENT DOCUMENTS

| | | | |
|---|---|---|---|
| 6,377,546 B1 | 4/2002 | Guerin et al. |
| 6,724,721 B1 | 4/2004 | Cheriton |
| 7,043,759 B2 | 5/2006 | Kaashoek et al. |
| 7,966,661 B2 | 6/2011 | Gunawardena |
| 2001/0042200 A1 | 11/2001 | Lamberton et al. |
| 2002/0093918 A1 | 7/2002 | Kim et al. |
| 2002/0147925 A1 | 10/2002 | Lingafelt et al. |
| 2002/0166071 A1 | 11/2002 | Lingafelt et al. |
| 2003/0004689 A1 | 1/2003 | Gupta et al. |
| 2003/0023733 A1 | 1/2003 | Lingafelt et al. |
| 2003/0023876 A1 | 1/2003 | Bardsley et al. |
| 2003/0037164 A1 | 2/2003 | Chaar et al. |
| 2003/0061514 A1 | 3/2003 | Bardsley et al. |
| 2003/0084327 A1 | 5/2003 | Lingafelt et al. |
| 2003/0110393 A1 | 6/2003 | Brock et al. |
| 2003/0126514 A1 | 7/2003 | Shabbir Alam et al. |
| 2003/0145225 A1 | 7/2003 | Bruton, III et al. |
| 2003/0145226 A1 | 7/2003 | Bruton, III et al. |
| 2003/0145236 A1 | 7/2003 | Tateoka |
| 2003/0196095 A1 | 10/2003 | Jeffries et al. |
| 2003/0200441 A1 | 10/2003 | Jeffries et al. |
| 2003/0229714 A1 | 12/2003 | Kiremidjian et al. |
| 2004/0044912 A1 | 3/2004 | Connary et al. |
| 2005/0246774 A1 | 11/2005 | Gunawardena |

FOREIGN PATENT DOCUMENTS

| | | |
|---|---|---|
| JP | 2003-283571 A | 10/2003 |
| JP | 2003-318967 A | 11/2003 |
| WO | 02/088879 A2 | 11/2002 |
| WO | WO02/088879 | 11/2002 |

OTHER PUBLICATIONS

Korean Patent Application 10-2005-35943; First Office Action dated May 31, 2011.
European Patent Application 05102903.1; Office Action dated Jan. 25, 2012.
Korean Patent Application 10-2005-35943; Second Office Action dated Feb. 21, 2012.

(Continued)

*Primary Examiner* — Cordelia Zecher (57) ABSTRACT

An improved network protocol for mitigating network amplification attacks is provided. The absolute network load that any transient distributed attack can cause is bounded based on a resource crediting scheme. The protocol accumulates "credit" upon reception and detection of candidate attack request packets, and draws against that credit when transmitting responsive packets. In some implementations, the time frame of such an attack is also bounded using time limits applied to a resource crediting scheme. Other resources may also be bounded by the resource crediting scheme, including without limitation CPU utilization, storage capacity, power, etc.

20 Claims, 8 Drawing Sheets

OTHER PUBLICATIONS

BUGTRAQ; "Possible Denial of Servie using DNS"; Jul. 30, 1999.

Ioannidis, J. et al.; "Implementing Pushback: Router-Based Defense Against DDoS Attacks"; 9th Annual Symposium on Network and Distributed System Security; [Online] Feb. 2002; pp. 1-8.

European PT Application 05102903.1; European Search Report; Mar. 30, 2006; Munich.

Chinese PT Application 200510064913.0; First Office Action; Mar. 28, 2008.

Chinese PT Application 200510064913.0; Second Office Action; Feb. 5, 2010.

Chinese PT Application 200510064913.0; Third Office Action; Jan. 31, 2011.

Japanese PT Application 2005-114426; First Office Action (English translation); Jul. 2, 2010.

Japanese PT Application 2005-114426; Final Office Action (English translation); Feb. 8, 2011.

Korean Patent Application 10-2005-35943; Final Rejection dated Sep. 7, 2012.

NETWORK AMPLIFICATION ATTACK MITIGATION

CROSS-REFERENCE TO RELATED APPLICATIONS

This patent application is a continuation of, and claims priority from, U.S. patent application Ser. No. 10/837,434 filed on Apr. 29, 2004, which is incorporated herein by reference in its entirety.

TECHNICAL FIELD

The invention relates generally to a network infrastructure, and more particularly to network amplification attack mitigation.

BACKGROUND

Denial of service (DoS) attacks on Internet sites are all too frequent occurrences, causing certain forms of malicious damage to affected computer systems. Generally, a DoS attack aims to prevent legitimate users from accessing computer services on such systems. For example, by overwhelming the network bandwidth of a business's web site, a malicious computer (or groups of computers) can prevent other users from accessing the business's web site and placing orders or obtaining services. Reasons for such attacks vary but there are recent attempts at blackmail, similar to a protection racket. In some circumstances, DoS attacks can also resemble "picketing" the business that owns the computer system.

Perpetrators can generate a DoS attack in a number of ways. Three basic areas of attack exist, although other attacks may be used:
(1) the consumption of limited resources, such as bandwidth, disk space or CPU time;
(2) alterations to configuration information, such as routing information or registry entries; and
(3) the physical disruption of networking components Attacks on resources have become increasingly popular, mainly through attempts to "flood" a network with excess or spurious packet data over the Internet, thereby preventing legitimate traffic to the web site. In a distributed denial-of-service (DDoS) attack, many computers work together to attack a target system.

Some DDoS attacks use distributed intermediary devices against a network endpoint (i.e., an end system). A potentially untrustworthy or hostile master controller has the ability to instruct a number of intermediary slave agents (e.g., routers or proxies) to send excessive network traffic (i.e., attack traffic) to an end system in the network (or to otherwise use some resource of that end system excessively). Where the attack traffic load generated from each slave is greater than the traffic load injected into the slaves by the rogue master controller or "perpetrator", the attack is termed a "network amplification attack".

SUMMARY

Implementations described and claimed herein address the foregoing problems by providing an improved network protocol for mitigating network amplification attacks. The absolute network load or resource load that any transient distributed attack can cause is bounded based on a resource crediting scheme. In some implementations, the time frame of such an attack is also bounded using time limits applied to a resource crediting scheme.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

The computer program product encodes a computer program for a computer process executing on a computer system. The computer process mitigates an amplification attack by a controller node on an end system in a network. One or more candidate attack request packets received by an intermediary node in the network are detected. Response traffic of response packets communicated from the intermediary node to the end system is limited by a credit derived from the candidate attack request packets communicated from the controller node to the intermediary node.

In another implementation, a method is provided that mitigates an amplification attack by a controller node on an end system in a network. One or more candidate attack request packets received by an intermediary node in the network are detected. Response traffic of response packets communicated from the intermediary node to the end system is limited by a credit derived from the detected candidate attack request packets communicated from the controller node to the intermediary node. Each response packet transmitted from the intermediary node to the end system draws on the credit.

In another implementation, an application for mitigating an amplification attack by a controller node on an end system in a network is provided. A network request processor detects one or more candidate attack request packets received by an intermediary node in the network. A transmission scheduler limits response traffic of response packets communicated from the intermediary node to the end system by a credit derived from the candidate attack request packets communicated from the controller node to the intermediary node.

In yet another implementation, a networking subsystem for mitigating an amplification attack by a controller node on an end system in a network is provided. A network request processor detects one or more candidate attack request packets received by an intermediary node in the network. A transmission scheduler limits response traffic of response packets communicated from the intermediary node to the end system by a credit derived from the candidate attack request packets communicated from the controller node to the intermediary node.

Other implementations are also described and recited herein.

DETAILED DESCRIPTIONS

An improved network protocol for mitigating network amplification attacks is provided. The absolute network load or resource load that any transient distributed attack can cause is bounded based on a resource crediting scheme. The protocol accumulates "credit" upon reception and detection of candidate attack request packets, and draws against that credit when transmitting responsive packets. In some implementations, the time frame of such an attack is also bounded using time limits applied to a resource crediting scheme.

Figure 1:
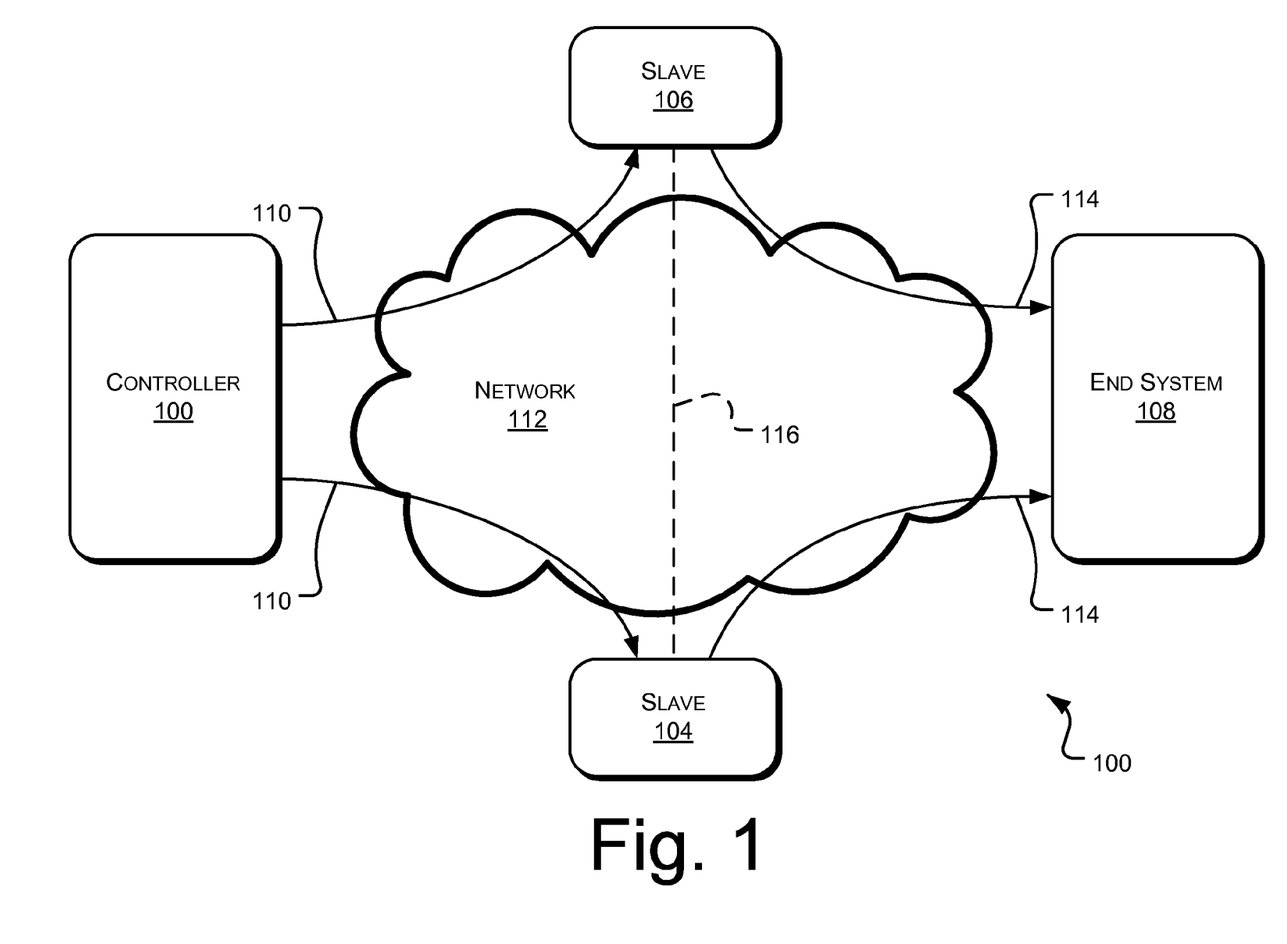
FIG. 1 illustrates a network configuration including a controller node, a plurality of intermediary nodes, and an end system.

FIG. 1 illustrates a network configuration 100 including a controller node 102, a plurality of intermediary nodes 104 and 106 (e.g., such as proxy servers), and an end system 108, such as an e-commerce site or other resource server of an enterprise. In an exemplary amplification attack scenario, the controller node 102 (or "perpetrator") sends a large amount of attack request traffic 110 to the intermediary nodes 104 and 106 over the network 112. This traffic includes attack request packets, each of which is configured to cause the individual intermediary nodes 104 and 106 to send attack response packets 114 to the end node 108. Thus, if the amount of attack response data is greater than the amount of attack request data, an "amplified" level of attack response traffic 114 is communicated to the end system 208 (i.e., relative to the level of attack request traffic).

For example, a rogue controller node 102 can send a large amount of HTTP GET request traffic to the intermediary nodes 104 and 106. In one type of attack, the HTTP GET request traffic contains attack request packets that include spoofed source addresses of a victim (i.e., the end node 108). An intermediary node will respond to a HTTP GET request packet by sending a sequence of HTTP RESPONSE packets to the source address of the attack traffic, and such response traffic is often greater than that of the inserted HTTP GET request traffic. Therefore, the intermediary node multiplies the traffic received from the rogue controller node 102, such that the intermediary node sends "amplified" response traffic as an attack on the end node 108. The use of multiple intermediary nodes 104 and 106 further amplifies this effect. Such amplified attack traffic can overwhelm available bandwidth and other resources of the end node 108, resulting in a "denial of service" attack on the end node 108. The operation of both the intermediary nodes 104 and 106 and the end system 108 can be impaired by such attacks.

It should be understood that not all packets received by intermediary nodes necessarily constitute attack request packets. In many scenarios, an arbitrary controller node can send a legitimate request to a proxy server for access to an end system without constituting an attack. For example, intermediary nodes can receive and respond to legitimate HTTP GET requests without the requests being part of an attack. Nevertheless, a controller node can also send an attack request packet to a proxy server as part of an amplification attack. Discerning between individual legitimate request packets and attack request packets can be problematic because the rogue nature of attack request packets is often not apparent on an individual packet basis.

In addition, in one implementation, a trust relationship can exist between a controller node and an intermediary node, such that packets received within the trust relationship may be deemed safe or "non-attack" packets. Accordingly, such packets may be given exclusion from consideration as "candidate" attack request packets in some implementations. However, it should be understood that even traffic communicated within a trust relationship may include attack request packets; therefore, in other implementations, such packets are still considered potential attackers. A network administrator may configure the intermediary node as to whether trusted packets are considered candidate attack request packets. Nevertheless, a candidate attack request packet may or may not actually be an attack request packet.

Hence, a "candidate attack request packet" refers to a controller request packet that implies or specifies an amount of a monitored resource by the controller node, and if executed upon by an intermediary node, would result in consumption of (or a request for consumption of) a responsive amount of that monitored resource at an end system. The responsive amount may be greater than, less than, or equal to the requested amount. Such candidate attack request packets may result in a distributed denial of service attack with possible amplification. An example of an "implied" amount of a resource is network bandwidth, which may be implied by the volume of request packet traffic. In contrast, a storage request may specify the amount of storage requested by the controller node.

One example of a candidate attack request packet includes an HTTP request from a controller that is received and detected by a web proxy, wherein the web proxy can only satisfy the request by making a proxy request to another server (e.g. the server suggested by the URL or the next hop proxy). Also, in some implementations, candidate attack request packets may be handled normally within a mitigation framework by an intermediary node in the network without relying on a prior trust/identity relationship existing between the intermediary node and the controller node.

Given the possibility of receiving attack request packets, each intermediary node 104 and 106 incorporates a feature that mitigates the possible damage that may be caused in response to such packets. To this end, the intermediary nodes 104 and 106 can detect candidate attack request packets and limit the outgoing traffic of possible attack response packets based on the incoming candidate attack request packet traffic. In one implementation, an amplification ratio (between received request packets from a given source and transmitted response packets through each intermediary node) is limited to no more than a 1:1 ratio (e.g., 1:"≦1"). In other implementations, an acceptable amplification ratio may be limited to the proximity of a 1:1 ratio (e.g., 1:"≦1.1", 1:"≦2", or greater defined ratios that are deemed acceptable by the network administrator). A ratio greater than 1:1 affords a shorter charging cycle for the controller. Nevertheless, the network administrator may find this tradeoff acceptable to improve performance of legitimate traffic through the intermediary node. By thus limiting the level of response traffic from each intermediary node to the end system based on the level of candidate attack request traffic received, the incentive for an attacker to go to the trouble of hijacking the distributed slaves is greatly reduced.

In addition, if communication over a trusted channel 116 exists between the intermediary nodes, then the intermediary nodes can coordinate their management of the amplification ratios to provide distributed policing and monitoring of network use.

Figure 2:
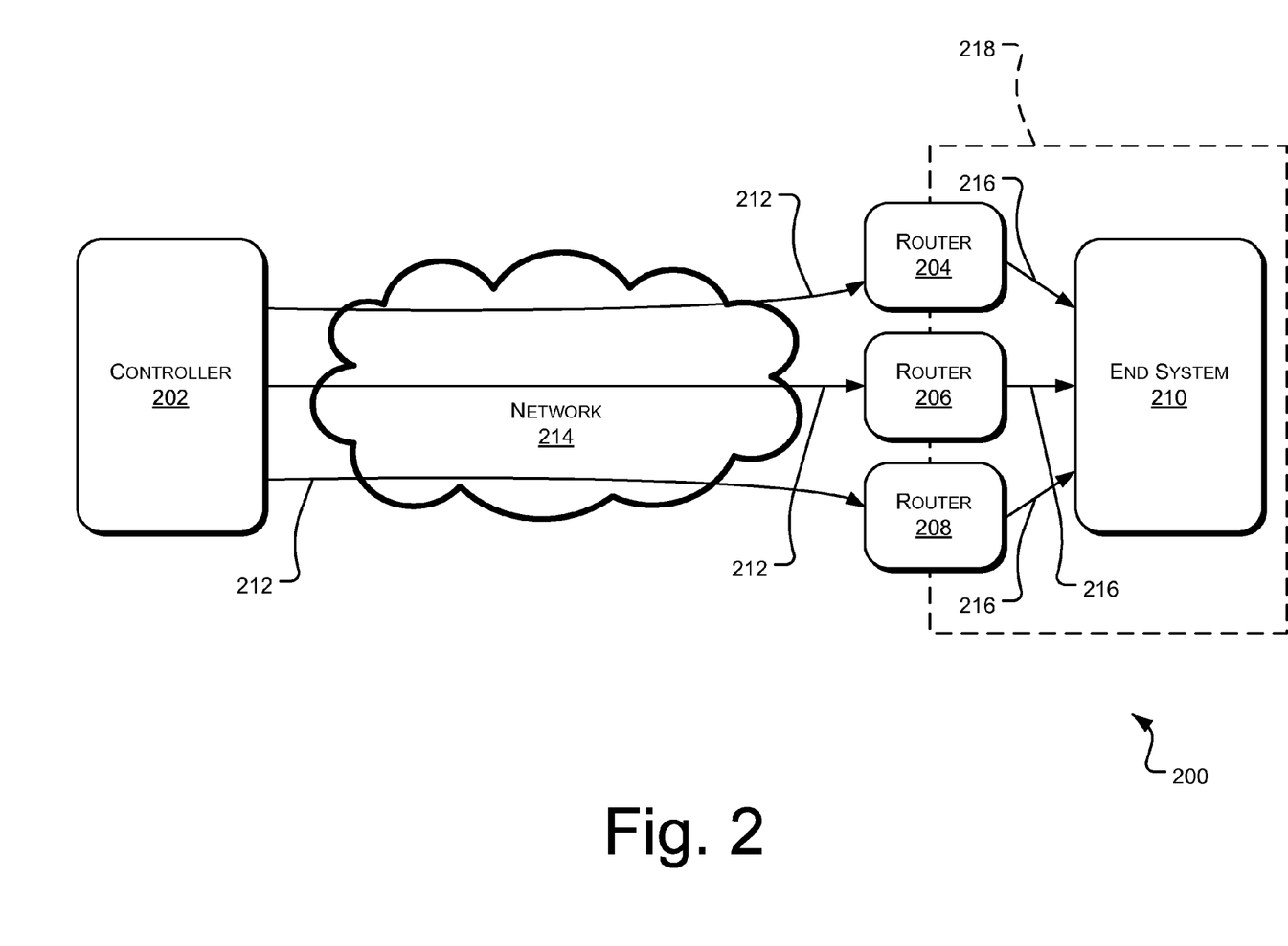
FIG. 2 illustrates a network configuration including a controller node, a plurality of intermediary nodes in the form of routers, and an end system.

FIG. 2 illustrates a network configuration 200 including a controller node 202, a plurality of intermediary nodes 204, 206, and 208 in the form of routers, and an end system 210, such as an e-commerce site or other resource server of an enterprise. For example, the routers 204, 206, and 208 route packets into the internal network of enterprise 218. In an exemplary amplification attack scenario, a rogue controller node 202 inserts a large volume of attack request packets 212 into the routers 204, 206, and 208 over a network 214. The attack request packets are configured to cause each router to send a sequence of attack response packets 216 to the end node 210 (e.g., by spoofing the source address in an HTTP GET request or some other method). Thus, an amplified level of attack response traffic 216 is communicated to the end system 210.

However, the intermediary nodes 204, 206, and 208 can detect candidate attack request packets and limit the outgoing traffic of possible attack response packets based on the detection of incoming candidate attack request packet traffic. In one implementation, a 1:"≦1" amplification ratio is maintained between received request packets and transmitted response packets through each intermediary node. By thus limiting the level of response traffic from each router to the end system based on the level of candidate attack request traffic received, the incentive for an attacker to go to the trouble of hijacking the distributed slaves is greatly reduced.

In a manner similar to that discussed with regard to FIG. 1, if communication over trusted channels exists between the intermediary nodes, then the intermediary nodes can coordinate their management of the amplification ratios to provide distributed policing and monitoring of network use.

Figure 3:
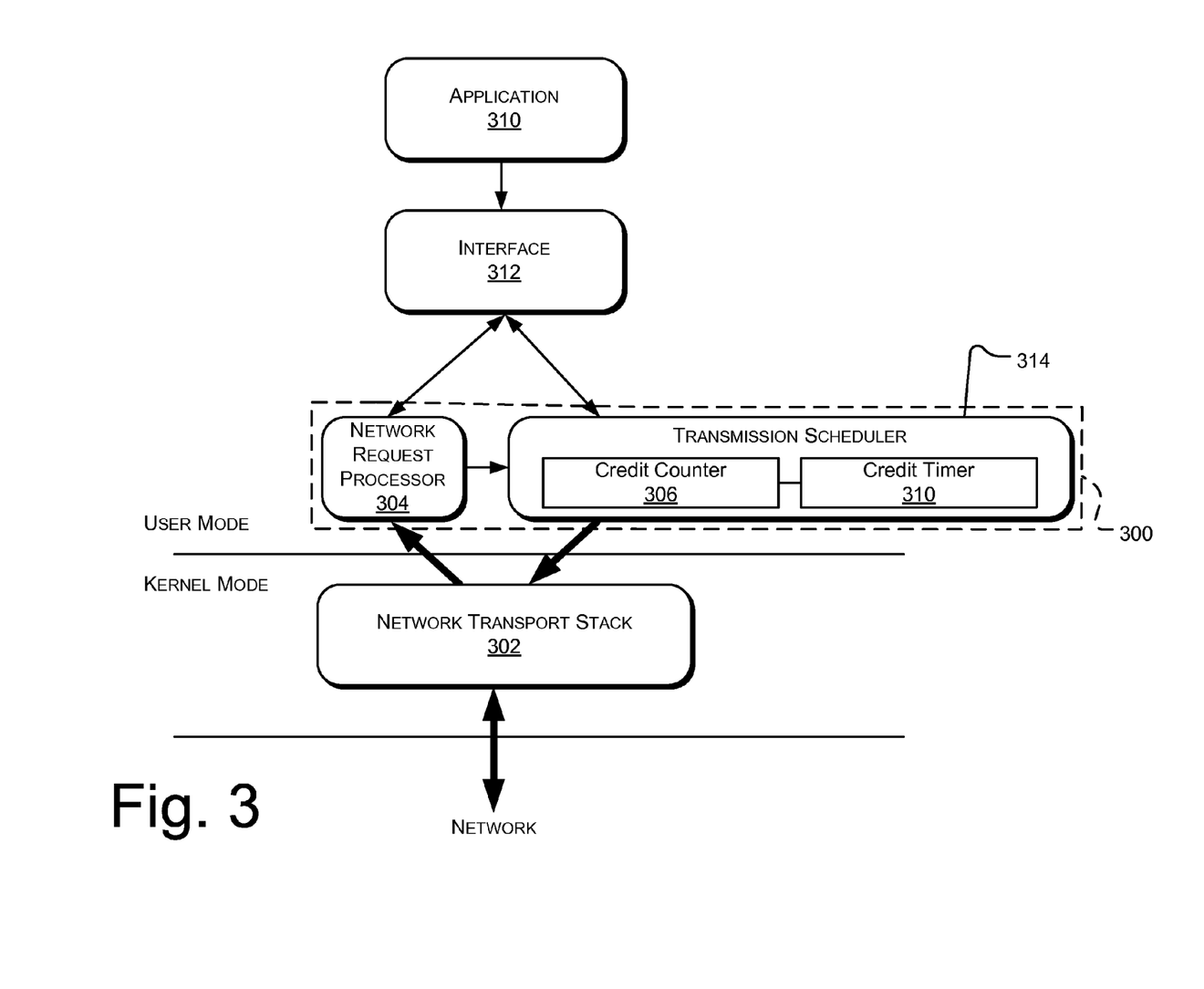
FIG. 3 illustrates an exemplary implementation of an amplification attack mitigation subsystem.

FIG. 3 illustrates an exemplary implementation of an amplification attack mitigation subsystem 300. In the illustrated implementation of FIG. 3, the amplification attack mitigation system is implemented as a network subsystem module (e.g., in a protocol driver) that provides an attack mitigation function for an intermediary node.

Packet traffic is communicated with a network through a network transport stack 302. Received packets, which may include request packets from a legitimate node or a rogue node, are passed to a network request processor 304, which detects/evaluates the destination address, the type, and source address of each packet. Based on this information, the network request processor 304 determines whether each received packet is a candidate attack request packet. This detection may be configured to define the packet information that causes a packet to be considered "candidate" attack request packets. For example, an administrator may determine that packets of a given type or to a given destination address are never considered "candidates" for an attack. Therefore, the detection operation, in one implementation, is selective and configurable.

If a candidate attack request packet is detected, the network request processor 304 computes a credit for that packet. Exemplary credit properties may be based on packet size, storage demand size, central processor unit (CPU) usage demand, power requirement, etc. The computed credit for each packet is passed to the credit counter 306 of the transmission scheduler 308 and the packet is forwarded on to the destination application 310, such as a proxy application, a routing application, or some other intermediary application, through an interface 312.

The credit counter 306 maintains a balance of credit available for transmission. In a simple example using received bytes as the credit property, if the intermediary node receives five candidate attack request packets of 100 bytes each, 500 units of credit may be "deposited" to the credit counter 306. Accordingly, up to 500 bytes may be transmitted in response to the received request packets, wherein the credit is drawn down as the response packets are transmitted through the transmission scheduler 308. In one implementation, credit is accumulated for all controllers (not on a per-controller basis) to avoid the scenario in which an attacker impersonates the identity of multiple valid controllers in order to create an amplified build-up of credit. However, in other implementations, credit may be accumulated and evaluated on a per-controller basis, on a per-packet-type basis, on a per-end system basis (e.g., the set of hosts that are reliably identified within a given class of system), and on other finer grained bases.

In an exemplary implementation, the credit counter 306 is also bounded, in that a credit limit L is set that limits the maximum amount of credit that may be accumulated by the credit counter 306. As such, an intermediary node is able to accumulate credit (e.g., based on the received amount of data received from the current controller) up to the credit limit L.

In addition, in an exemplary implementation, the credit counter 306 may also interact with a credit timer 314, which limits the period in which credit may be available for a transmission through the transmission scheduler 308. In an initial state (e.g., in which no credit is accumulated in the credit counter 306), the credit timer 314 is started from a timeout value of T when credit is added to the credit counter 306. During the period that the credit timer 314 is counting down, transmissions may be drawn against the credit maintained by the credit counter 306. If the credit timer 314 expires, then all remaining credit in the credit counter 306 is cancelled (e.g., zeroed out). The credit limit value L and the timeout value T may be set to coincide with the real work load anticipated within the network.

If additional candidate attack request packets are received by the intermediary node while the credit timer 314 is counting down and the credit counter 306 is not at its maximum value L, the credit timer 314 is restarted from the timeout value T. If, when additional candidate attack request packets are received, the credit counter 306 is already at its maximum value L during a countdown of the credit timer 314, the countdown continues without a restart.

Based on the configuration described with regard to FIG. 3, the exposure of the network to a distributed attack (i.e., the maximum number of attack bytes $B_{max}$) is bounded by the Min($U*T$, $N*L$), where U represents the "Attacker's Uplink Bandwidth" and N represents the "Number of Intermediaries in the Network". A designer of a distributed network protocol for an enterprise can define an acceptable value of $B_{max}$. In one implementation, $B_{max}$ be bounded by the minimum downlink bandwidth across all known attack targets in the enterprise's network.

The interface 312 provides a communications interface between the application 310 and the amplification attack mitigation subsystem 300. In addition, the interface 312 may also provide a user interface to allow an administrator to monitor network statistics, including observations of credit states and timer states, and to configure subsystem properties (e.g., the credit limit L or the timeout value T).

It should be understood that, in some implementations, an intermediary node may maintain individual credit counters and timers for different resources (e.g., bandwidth, storage, etc.), different controller addresses, different end systems, different packet types, and other criteria. The intermediary node tracks which response packets result from which request packets and draws down the credit from the corresponding credit counters.

Figure 4:
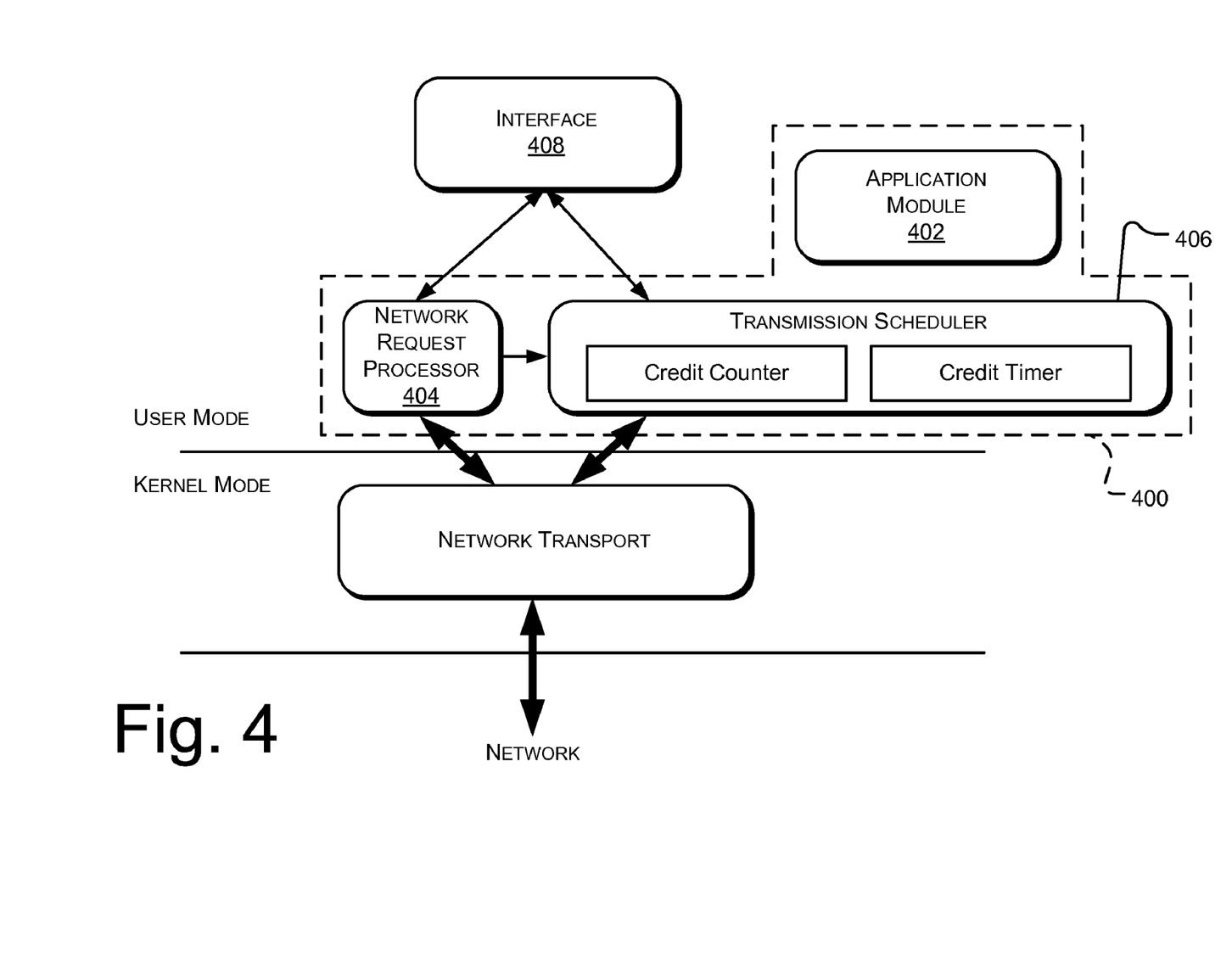
FIG. 4 illustrates an exemplary implementation of amplification attack mitigation components in an application.

FIG. 4 illustrates an exemplary implementation of amplification attack mitigation components in an application 400. One difference in the application attack components of FIG. 4 is that the application attack components are integrated into the application 400, such that the application module 402 communicates directly with a network request processor 404 and a transmission scheduler 406, rather than through an interface 408. Generally, the implementations illustrated in FIGS. 3 and 4 represent that amplification attack mitigation subsystems may be deployed within network subsystems (FIG. 3) or as features of an application (FIG. 4), such as a proxy application or a router application.

Figure 5:
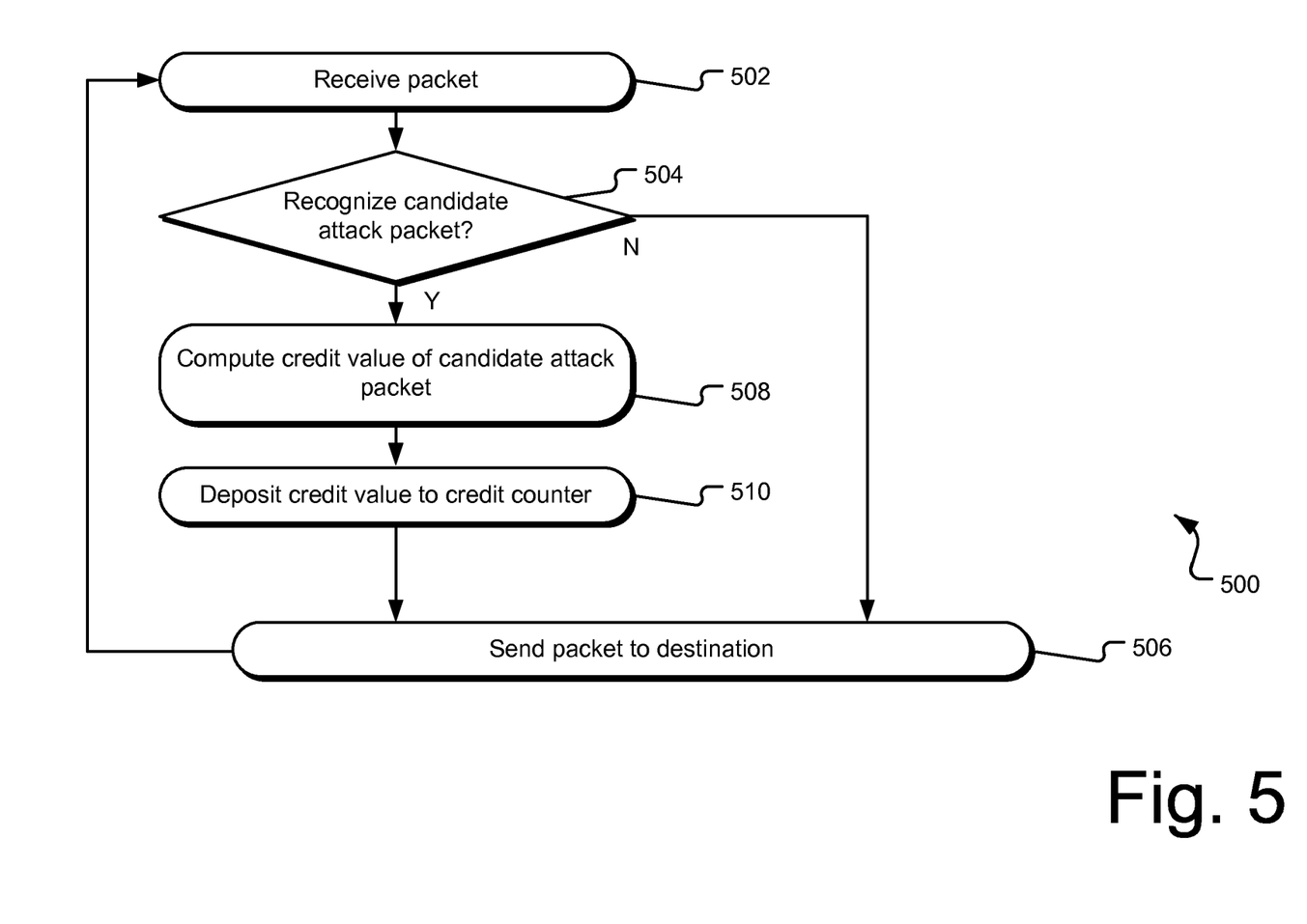
FIG. 5 illustrates exemplary operations for receiving packets.

FIG. 5 illustrates exemplary operations 500 for receiving packets. A receiving operation 502 receives packets from one or more sources. The received packets may include non-attacking packets and attack request packets. A detecting operation 504 evaluates each packet to determine whether the packet might be an attack packet based on an available candidate definition. For example, the detecting operation 504 may apply a candidate definition to each packet and designate the packet as a candidate attack request packet if the packet satisfies the definition. Exemplary candidate definition parameters may include source addresses, packet types, destination addresses, dates, times, packet sizes, and other packet characteristics.

For example, a TCP stack signature may be used as a candidate definition parameter. The delay and behavior of a specific TCP implementation is evaluated to identify a specific end system type/version. This is possible because the TCP/IP specification allows sufficient flexibility to allow for subtly different implementations. Detection of these subtly different behaviors is a classic hacker technique for determining if the end system is running a particular OS version and whether the particular patch level of the TCP/IP stack is vulnerable to known exploits.

If a packet is not designated as a candidate attack request packet, the packet is sent to the destination (e.g., an application within the intermediary node) by sending operation 506. However, if the packet is designated as a candidate attack request packet, a credit value for the packet is computed (e.g., the size of the packet, the amount of a resource demanded, etc.) in a computing operation 508.

The computed credit is "deposited" into the credit counter in depositing operation 510, up to the credit limit L of the intermediary node. The deposit may result in restarting the credit timer if the credit counter is not at its credit limit. The received packet is then sent to the destination (i.e., a local application) by sending operation 507. Processing then returns to receiving operation 502 to receive a subsequent packet.

Figure 6:
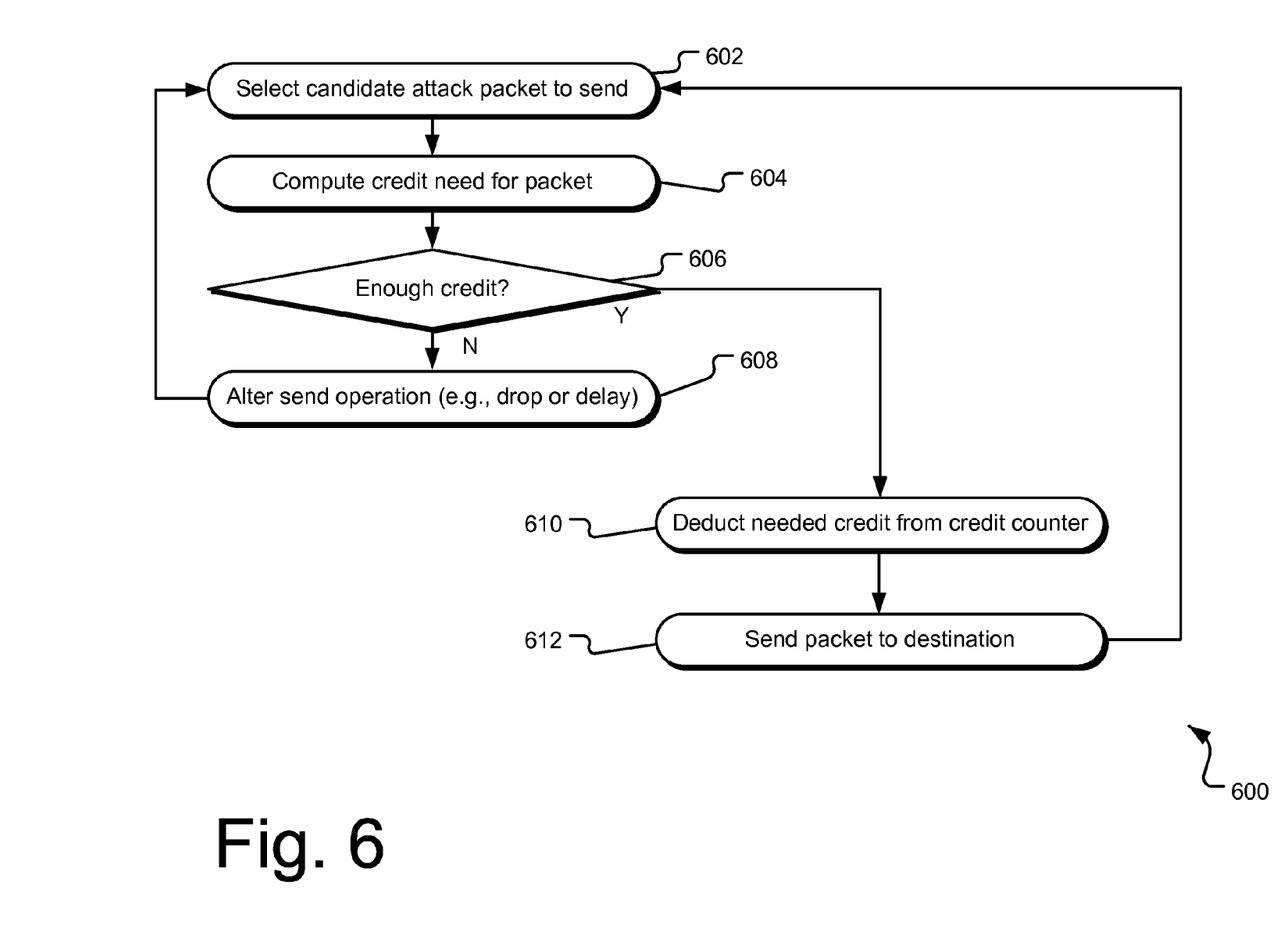
FIG. 6 illustrates exemplary operations for transmitting response packets.

FIG. 6 illustrates exemplary operations 600 for transmitting response packets. A selection operation 602 selects a packet from a transmission buffer populated by an application or service in the intermediary node. A computing operation 604 computes the credit required to transmit the selected packet to the destination. For example, the size of the packet may be used as a credit requirement. In contrast, the amount of storage demanded of the destination node by the selected packet (i.e., in a backup or data mirroring application) may also be used as a credit property. Other credit properties may also be employed, including CPU demands, storage capacities, power, etc.

A decision operation 606 determines whether enough credit exists in the credit counter to transmit the packet. If not, the transmission of the packet is altered in some way in altering operation 608. For example, the transmission of the packet may be delayed until sufficient credit exists and/or abandoned (e.g., the packet is dropped). Processing then returns to receiving operation 602 to select a subsequent packet.

If sufficient credit to transmit the packet exists in the credit counter, a deducting operation 610 deducts the needed credit from the credit counter and a transmission operation 612 sends the packet to its destination. Processing then returns to receiving operation 602 to select a subsequent packet.

Figure 7:
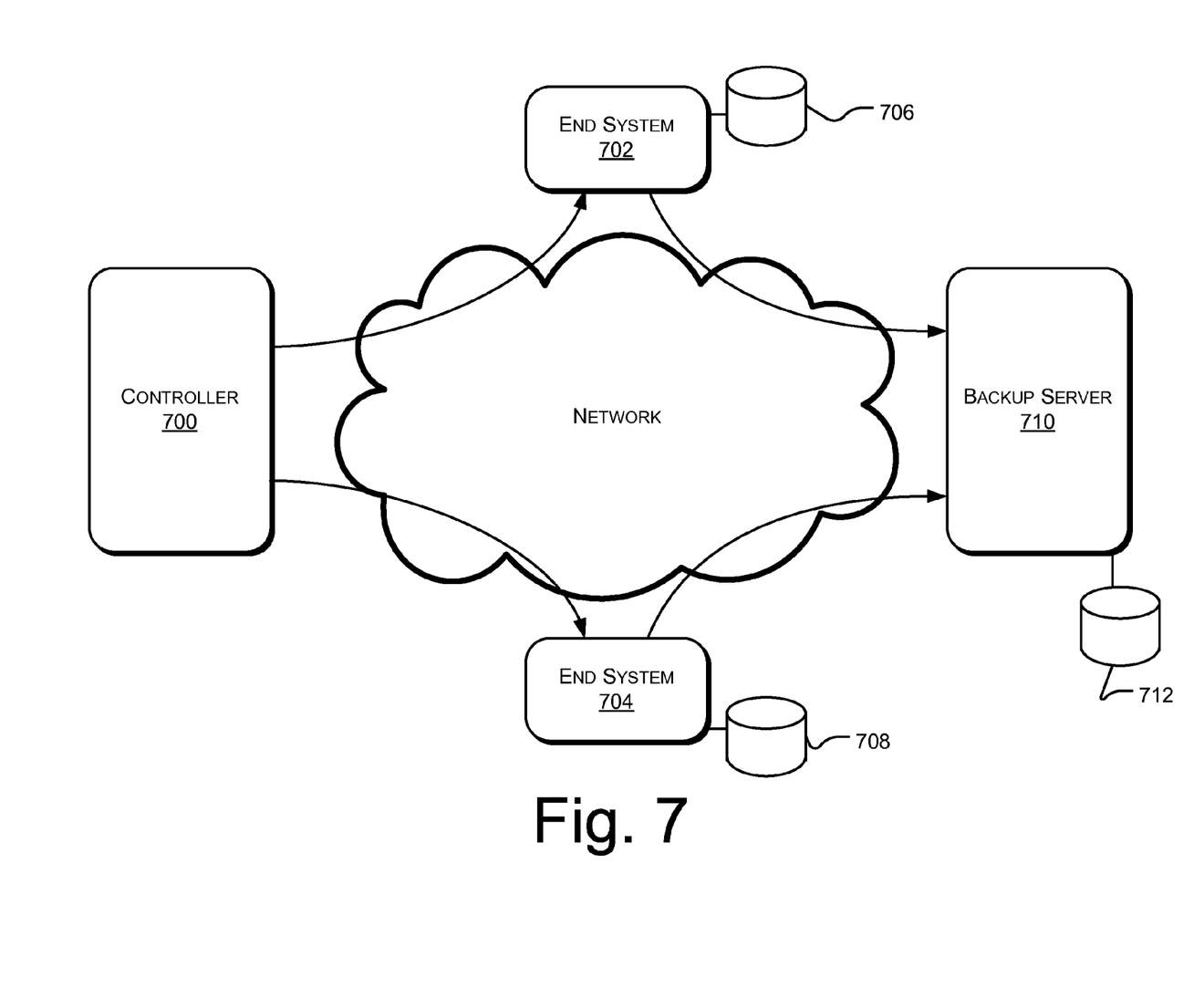
FIG. 7 illustrates a network configuration including a controller node, a plurality of end systems with storage resources and a backup server with a storage resource.

FIG. 7 illustrates a network configuration including a controller node 700, a plurality of end systems 702 and 704 with storage resources 706 and 708, and a backup server 710 with a storage resource 712. The architecture of FIG. 7 is designed to allow the controller node 700 store data on the storage resource 706 and 708, such that the stored data is then backed up on the storage resource 712 of the backup server 710. In operation, the controller node 700 can transmit storage packets requiring a specified amount of storage space at the end system 702, for example. In response to this request, the end system 702 stores the data in the storage resource 706 and forwards a backup request and the data to the backup server 710.

In sufficient volume, a rogue controller node can overwhelm the backup server 710 with such requests through one or more end systems, such that the bandwidth to the backup server 710 is saturated and/or the available storage and CPU capacity are depleted. Accordingly, by limiting the amount of backup storage requested through the end systems 702 and 704 (which are acting as intermediary nodes between the controller node 700 and the backup server 710 in this example) using credit counting and credit timing, any impairment to the performance and resources of the backup server and the end systems may be mitigated.

It should also be understood that other end system resources may be protected in various implementations of the described systems, methods, and program products, including without limitation CPU capacity, electrical power from a power grid or battery backup, and memory capacity.

Figure 8:
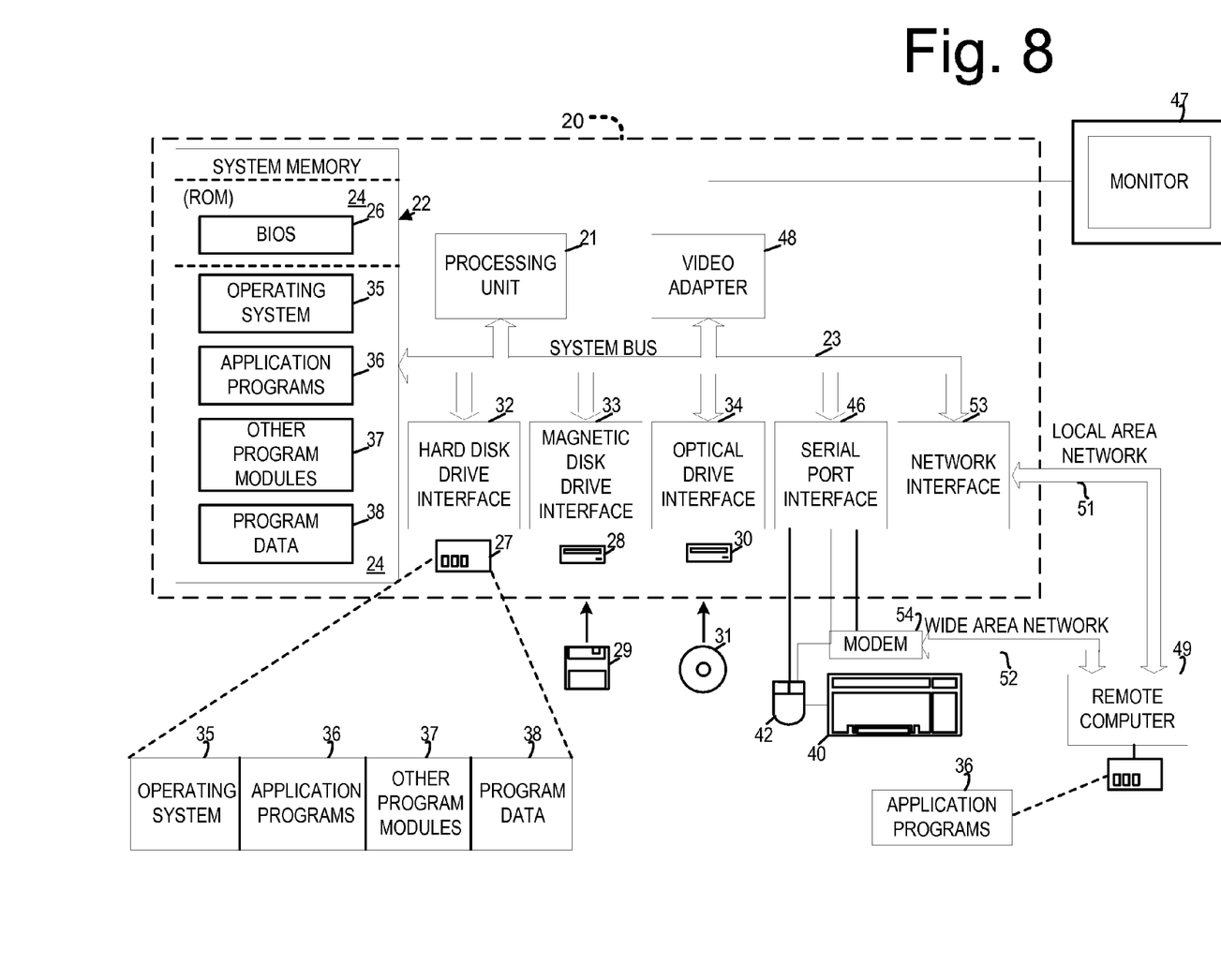
FIG. 8 illustrates an exemplary system useful in implementations of the described technology.

The exemplary hardware and operating environment of FIG. 8 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 8. The logical connections depicted in FIG. 8 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, a network request processor, a transmission scheduler, an interface, and application module, a network transport stack, and other modules may be incorporated as part of the operating system 35, application programs 36, or other program modules 37. Credit data, a credit limit, a timeout value, source and destination addresses, candidate definitions, and other data may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method comprising:
    evaluating whether a packet received by an intermediary node is a trusted packet or a candidate attack request packet;
    accessing an account associated with a source of the candidate attack request packet, wherein the account is credited based upon properties of packets received by the intermediary node from the source, and wherein credits are removed from the account when resources are expended by the intermediary node on behalf of the source; and
    authorizing resource expenditure by the intermediary node based upon a balance of the account.

2. The method according to claim 1, the resource expenditure comprising sending, by the intermediate node, one or more other packets to a destination on behalf of the source.

3. The method according to claim 2, further comprising limiting an amplification ratio of the source.

4. The method according to claim 3, the amplification ratio being limited to a ratio greater than 1:1.

5. The method according to claim 1, the properties of the packets used to credit the account comprising packet size or storage demand size.

6. The method according to claim 1, the properties of the packets used to credit the account comprising processor unit usage demand.

7. The method according to claim 1, the account also being associated with at least one other source.

8. One or more computer readable storage devices comprising computer-readable instructions that, when executed by one or more computers, cause the one or more computers to perform the method of claim 1.

9. One or more computer readable storage devices comprising computer-readable instructions that, when executed by one or more computers, cause the one or more computers to perform:
    determining a source of a received packet, wherein the received packet requests that one or more other packets be sent on behalf of the source to a destination;
    accessing a balance that reflects a number of packets received from the source and a number of packets sent on behalf of the source to the destination; and,
    sending the one or more other packets to the destination, on behalf of the source, so long as the balance is positive.

10. The one or more computer-readable storage devices according to claim 9, comprising further computer-readable instructions that, when executed by the one or more computers, cause the one or more computers to perform:
   delaying or dropping the one or more other packets in an instance when the balance is negative.

11. The one or more computer-readable storage devices according to claim 10, wherein the one or more other packets are delayed until the balance reflects sufficient credit to send the one or more other packets to the destination.

12. The one or more computer-readable storage devices according to claim 9, wherein:
   the received packet comprises a hypertext transfer protocol GET request, and
   the one or more other packets sent to the destination on behalf of the source comprise one or more hypertext transfer protocol RESPONSE packets that are responsive to the GET request.

13. The one or more computer-readable storage devices according to claim 9, wherein the received packet includes a spoofed source address that is an address of the destination.

14. The one or more computer-readable storage devices according to claim 9, wherein the balance also reflects a number of packets received from other sources.

15. A system comprising:
   an intermediary node configured to:
      receive incoming traffic from a controller node, the incoming traffic requesting that the intermediary node send outgoing traffic to an end system on behalf of the controller node;
      accumulate credit in a credit counter as the incoming traffic is received from the controller node by the intermediary node;
      draw credit from the credit counter as the outgoing traffic is sent from the intermediary node to the end system;
      determine whether enough credit is in the credit counter to continue sending the outgoing traffic from the intermediary node to the end system; and
      in an instance when there is not enough credit in the credit counter, stop or delay sending the outgoing traffic from the intermediary node to the end system on behalf of the controller node.

16. The system according to claim 15, further comprising the controller node.

17. The system according to claim 16, further comprising the end system.

18. The system according to claim 15, wherein the intermediary node comprises a router.

19. The system according to claim 15, the intermediary node being further configured to:
   cancel at least some of the credit responsive to expiration of a timer; and
   restart the timer responsive to receiving additional incoming traffic from the controller node.

20. The system according to claim 15, the intermediary node being further configured to:
   restart sending the outgoing traffic to the end system on behalf of the controller node responsive to determining that sufficient credit has accumulated in the credit counter.

* * * * *